(12) United States Patent
Mount

(10) Patent No.: US 12,322,008 B2
(45) Date of Patent: Jun. 3, 2025

(54) PIXEL-ALIGNED DRAWING WITH FLOATING-POINT LAYOUT

(71) Applicant: Google LLC, Mountain View, CA (US)

(72) Inventor: George Francis Mount, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 94 days.

(21) Appl. No.: 17/996,440

(22) PCT Filed: May 5, 2020

(86) PCT No.: PCT/US2020/031526
§ 371 (c)(1),
(2) Date: Oct. 18, 2022

(87) PCT Pub. No.: WO2021/225585
PCT Pub. Date: Nov. 11, 2021

(65) Prior Publication Data
US 2023/0206520 A1    Jun. 29, 2023

(51) Int. Cl.
*G06T 11/20* (2006.01)
*G06T 7/13* (2017.01)
*G06T 7/30* (2017.01)
*G06T 11/40* (2006.01)

(52) U.S. Cl.
CPC ............... *G06T 11/203* (2013.01); *G06T 7/13* (2017.01); *G06T 7/30* (2017.01); *G06T 11/40* (2013.01); *G06T 2200/24* (2013.01)

(58) Field of Classification Search
None
See application file for complete search history.

(56) References Cited

U.S. PATENT DOCUMENTS

| | | |
|---|---|---|
| 7,583,851 B2 | 9/2009 | Kudo et al. |
| 2002/0130886 A1 | 9/2002 | Baldwin |
| 2003/0164830 A1 | 9/2003 | Kent |
| 2008/0278496 A1 | 11/2008 | Helfman et al. |
| 2013/0332869 A1 | 12/2013 | Ferry et al. |

(Continued)

OTHER PUBLICATIONS

Orżanowski, Tomasz, "Nonuniformity correction algorithm with efficient pixel offset estimation for infrared focal plane arrays," Orżanowski SpringerPlus, 2016, 8 pages, vol. 5, No. 1831.

(Continued)

*Primary Examiner* — Jwalant Amin
(74) *Attorney, Agent, or Firm* — McDonnell Boehnen Hulbert & Berghoff LLP

(57) ABSTRACT

This disclosure describes techniques and apparatuses directed to defining a layout (100) and drawing elements for display by a graphical user interface (810) on a display screen (808) of a computing device (802). The process of laying out a drawing area occurs in floating point, but drawing occurs aligned to pixel boundaries of the display screen. Drawing may also occur relative to pixel offsets with respect to the display screen and the layout. This layout process occurs in floating point to avoid accumulating errors. However, drawing occurs pixel-aligned, optionally relative to pixel offsets, to improve visual results including the centering of nested layouts and sharp element edges.

20 Claims, 5 Drawing Sheets

(56) References Cited

U.S. PATENT DOCUMENTS

2015/0222730 A1* 8/2015 Gower .................... H04L 67/01
709/203
2019/0354247 A1* 11/2019 Edmunds .............. G06F 3/0483

OTHER PUBLICATIONS

Stackoverflow, "Does Canvas Support Floating Point Numbers When Drawing Line or Arc?" https://stackoverflow.com/questions/29371695/does-canvas-support-floating-point-numbers-when-drawing-line-or-arc, Feb. 21, 2020, 5 pages.

* cited by examiner

PIXEL-ALIGNED DRAWING WITH FLOATING-POINT LAYOUT

This application is a national stage application under 35 U.S.C. § 371 of International Application No. PCT/US2020/031526, filed May 5, 2020, the disclosure of which is explicitly incorporated by reference herein in its entirety.

BACKGROUND

A layout defines an area for drawing an element to display on a screen of a computing device using a graphical user interface. Drawing an element aligned to pixel boundaries is important to maintain sharp image edges. If an element does not pixel-align to a pixel boundary, jagged (e.g., stairstep-like) edges result at the periphery of the element. Antialiasing techniques may be used to reduce the prominence of jagged edges by surrounding the stairsteps with intermediate shades of gray or color. However, this makes the element edge appear fuzzy, and the resulting image or text not sharp and crisp.

SUMMARY

This disclosure describes techniques and apparatuses for pixel-aligned drawing with floating-point layout. These techniques and apparatuses manage a layout and drawing of elements using a layout-and-drawing manager within a graphical user interface (GUI). By so doing, the techniques and apparatuses provide a precise layout in floating point, yet draw and display elements that are pixel-aligned, permitting a crisper and cleaner looking GUI.

The details of one or more implementations are set forth in the accompanying drawings and the following description. Other features and advantages will be apparent from the description, drawings, and claims. This Summary is provided to introduce subject matter that is further described in the detailed description and drawings. Accordingly, this Summary should not be considered to limit the scope of the claimed subject matter.

BRIEF DESCRIPTION OF THE DRAWINGS

The details of one or more aspects of techniques and apparatuses for defining a layout in floating point and drawing an element pixel-aligned are described with reference to the following drawings. The use of the same reference numbers in different instances in the description and the figures may indicate like features.

DETAILED DESCRIPTION

Overview

Figure 1:
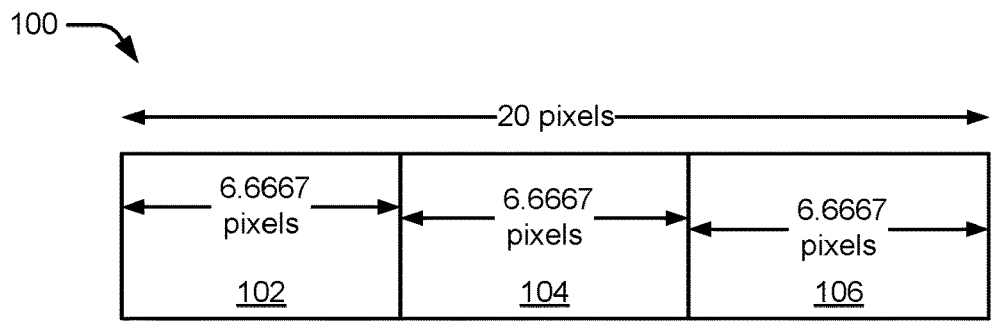
FIG. 1 illustrates a first example layout defined in floating point and having three children.

To pixel-align a layout for drawing in a GUI, some applications use integer layouts, where integer-based calculations define the layout in which the element is drawn. This ensures that drawing occurs pixel-aligned at pixel boundaries and that antialiasing is reduced. However, using an integer layout can accumulate errors. For example, when aligning to the center of an integer layout, the center alignment may divide a pixel. To avoid dividing a pixel, the application may modify the positioning of the layout to center either to the left pixel or the right pixel. Typically, the application modifies the layout positioning in the same left direction or right direction each time the divided-pixel scenario arises. This reiteration of positioning the layout in the same direction can be problematic. For example, if several centered layouts are nested inside each other, the error of consistently choosing the left or right pixel to center the layout accumulates, resulting in the nested layouts being off-center by several pixels.

It can also be challenging to divide up space with integer layouts evenly. A parent layout cannot always be divided evenly into a desired quantity of child layout sections. As such, the layout designer must choose which child sections should take fewer pixels and which should take more pixels to account for the uneven divide. Otherwise, the parent layout could end up with unfilled pixels. For example, in a layout with one hundred pixels, if seven child sections are assigned fourteen pixels each, that totals only ninety-eight pixels, leaving two pixels unfilled. One corrective option a designer could consider is to assign five child sections that are fourteen pixels each, totaling seventy pixels, and assign two child sections fifteen pixels each, totaling thirty pixels. The combined child sections (seventy plus thirty) then fill the one-hundred-pixel layout.

Other applications may use a floating-point layout for a GUI, where floating-point-based calculations define the layout. This ensures that the layout and drawing of elements occur at precisely-defined areas, regardless of where the layout and elements fall relative to physical pixels on the screen. However, using a floating-point layout has the opposite problem of using integer layout techniques. For example, with floating point, a layout may be well-centered at half of a pixel, but drawing is also done at partial pixels. This means that antialiasing can occur, making what was once a sharp single-pixel line now take up two blurry, antialiased pixels along the length of the pixel line. It can also make text rendering look poor as the text cache is designed to pixel-align similar to an integer-based calculation.

This disclosure describes techniques and apparatuses directed to defining a layout in floating point and drawing an element pixel-aligned for display on a screen of a computing device. A layout-and-drawing manager defines the layout in floating point so that a precise drawing area is established regardless of pixel boundaries. However, the layout-and-drawing manager provides for drawing elements integer-aligned to pixels (e.g., pixel-aligned) in the layout for improved visual results. Additionally, drawing may occur pixel-aligned relative to pixel offsets of an area of the screen for enhanced visual results. The layout is defined in floating point so that errors do not accumulate. However, drawing is pixel-aligned, and it may be relative to pixel offsets to maintain centering of nested layouts and crisp element edges. Pixel offsets may be determined relative to the total pixels on a defined area of the screen in which the layout is placed. The technical advantages of defining a layout in floating point, and yet drawing an element pixel-aligned relative to pixel offsets, are clear. For example, layouts are maintained precisely located with respect to the GUI of the computing device. Additionally, drawings retain crisper edges and sharper images for producing visually-enhanced and easier-to-read displays. Moreover, layout errors do not accumulate, and centering of nested layouts is maintained.

While any number of different environments, systems, devices, and/or various configurations can implement features and concepts of the described techniques and apparatuses, aspects of managing a layout in floating point, drawing pixel-aligned, and drawing pixel-aligned relative to defined pixel offsets are described in the context of the following example devices, methods, systems, and configurations.

Systems

FIG. 1 illustrates an example floating-point layout 100 defined in floating point. In this example, a parent layout has a 20-pixel width and includes layouts of three children identified as first child 102, second child 104, and third child 106, equally sized to fill the parent width. In this example, a first edge of the floating-point layout 100 is adjacent to a first edge of the first child 102, and a second edge of the floating-point layout 100 is adjacent to a second edge of the third child 106. A second edge of the first child 102 is adjacent to a first edge of the second child 104, and a second edge of the second child 104 is adjacent to a first edge of the third child 106. During the layout process of this example, the children are divided equally using floating-point arithmetic. In the example of FIG. 1, the calculation is simplified as 20÷3=6.6667 pixels for each child width. The term "layout" is used in this disclosure to represent any area defined for drawing one or more elements in a graphical user interface for display on a screen of a computing device. The term "element" is used in this disclosure to represent any basic drawing that occurs in a layout of the graphical user interface (e.g., component, item, icon, image, text, graphic).

Assume that the children 102, 104, and 106 are respectively filled with drawing elements having three different colors: blue, white, and green. Typically, without implementing aspects according to principles of this disclosure, this 20-pixel example color-fill using floating-point layout would produce antialiased edges for elements drawn at boundaries of the adjacent children, as shown in FIG. 2.

Figure 2:
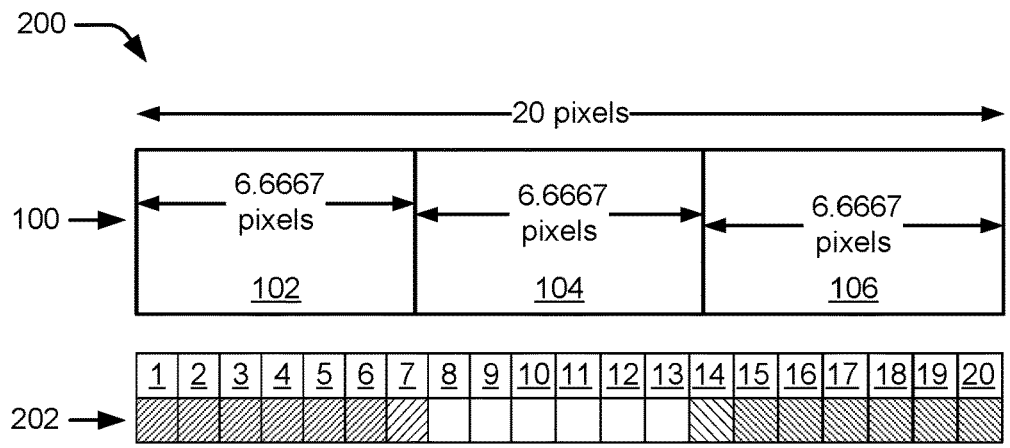
FIG. 2 illustrates a second example layout defined in floating point and having three children, including an element drawn relative to each child using antialiasing of pixels.

In FIG. 2, diagram 200 illustrates the floating-point layout 100 in reference to 20 physical pixels associated with a screen space 202 of a computing device. The pixels identified in the screen space 202, represented by pixel reference numbers 1 to 20, identify elements drawn relative to each child 102, 104, and 106. Reference numbers 1 to 20 indicate a pixel index with respect to the screen space 202. For simplicity of discussion, pixels identified in the screen space 202 represent a one-pixel-height element floating-point drawing, where each element is drawn in floating point relative to each child, as represented by the pixels filled with pattern markings and white space. In this example, pixels 1 to 6 are represented as being a first solid color (e.g., blue) as indicated by the upward-directed, narrow-spaced pattern. Pixel 7 is antialiased as a lighter shade of blue due to the floating-point layout and floating-point drawing, as indicated by the upward-directed, wider-spaced pattern. Pixels 8 to 13 are represented as a second solid color (e.g., white, and no pattern). Pixels 15 to 20 are represented as being a third solid color (e.g., green) as indicated by the downward-directed, narrow-spaced pattern. Pixel 14 is antialiased as a lighter shade of green due to the floating-point layout and floating-point drawing, as indicated by the downward-directed, wider-spaced pattern. Diagram 200 illustrates a failure of some current techniques, as the drawn elements do not have crisp edges due to antialiasing.

Figure 3:
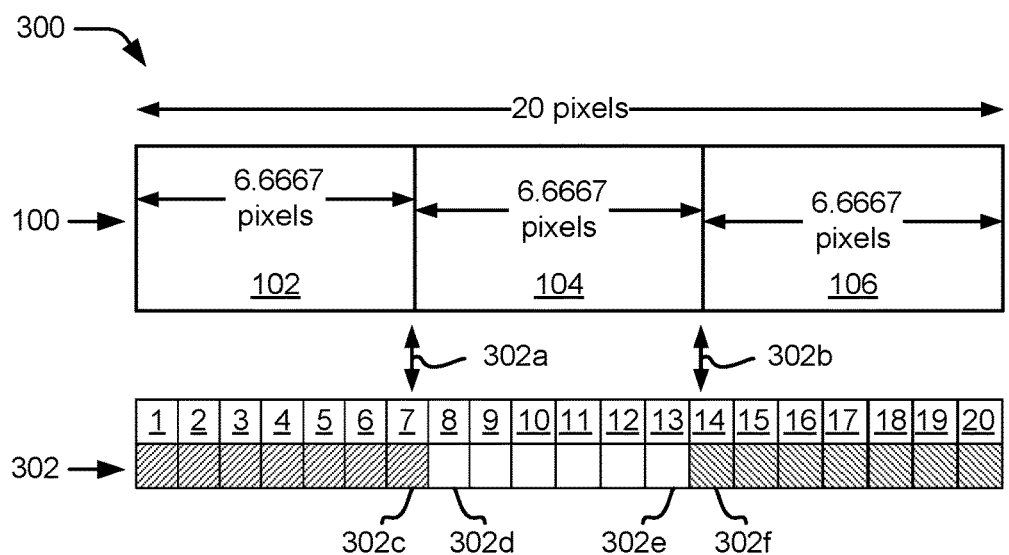
FIG. 3 illustrates a third example layout defined in floating point and having three children, including an element drawn relative to each child being pixel-aligned.

In contrast to some current techniques, FIG. 3 illustrates drawing an element pixel-aligned in a floating-point layout using a layout-and-drawing manager according to this disclosure. Diagram 300 depicts drawing elements pixel-aligned in a physical pixel screen space 302, represented by pixel reference numbers 1 to 20, with respect to the floating-point layout 100. As illustrated, the adjacent edges of the first child 102 and the second child 104 are not pixel-aligned to the physical pixel 7, shown at 302a of the screen space 302. Similarly, the adjacent edges of the second child 104 and the third child 106 are not pixel-aligned to the physical pixel 14, shown at 302b of the screen space 302. Accordingly, to pixel-align the drawing of elements pursuant to principles of this disclosure, the drawing element of the first child 102 becomes seven pixels wide, depicted as blue pixels 1 to 7. The drawing element of the first child ends at pixel 7, shown at 302c, calculated by rounding 6.6667 up to 7, based on 6.6667 being the floating-point layout width of the first child 102. The drawing element of the second child 104 is also adjusted to be pixel-aligned, and becomes six pixels wide, depicted as white pixels 8 to 13, shown bounded by 302d and 302e. The drawing element of the second child ends at pixel 13, calculated by rounding 13.3333 down to 13, based on 13.3333 being the floating-point layout pixel point of the adjacent edges of the second child 104 and the third child 106. The drawing element of the third child 106 is also pixel-aligned and becomes seven pixels wide, depicted as green pixels 14 to 20, pixel 14 shown at 302f.

This drawing of elements as pixel-aligned in a floating-point layout, as illustrated in diagram 300, uses aspects of a layout-and-drawing manager according to this disclosure, which provides clear, sharp edges of the drawing elements. These clear, sharp edges would not exist if drawing occurred using floating-point calculations and antialiasing for drawing the elements to match the floating-point layout. Note that the example of diagram 300 shows two areas identified by the seven blue pixels 1 to 7, and seven green pixels 14 to 20, with a round-up that squeezes down the centered area six white pixels 8 to 13. This shows an example with less than one pixel of error.

While FIG. 3 illustrates a simple example of aspects of a layout-and-drawing manager according to this disclosure for drawing pixel-aligned in a floating-point layout, FIG. 3 does not show the additional improved effect of implementing pixel offsets relative to a defined screen space. Pixel offsets are better understood with an example that assumes the 20-pixel floating-point layout 100 is actually centered in a 25-pixel screen space.

Figure 4:
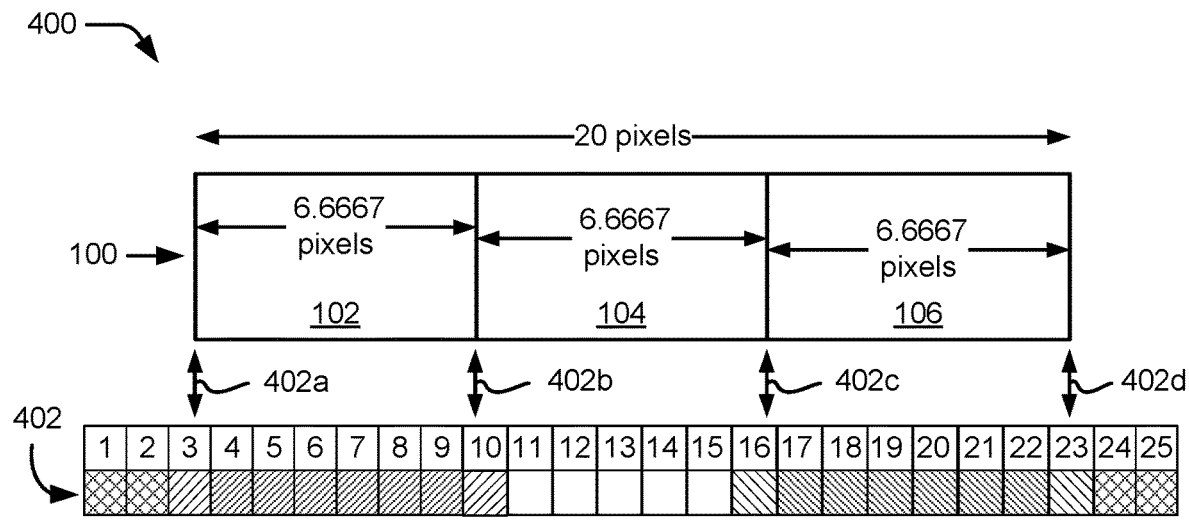
FIG. 4 illustrates a fourth example layout defined in floating point and having three children, illustrating the layout centered in a larger screen space of pixels, and including an element drawn relative to each child using antialiasing of pixels.

FIG. 4 illustrates a diagram 400 using floating-point layout to center the 20-pixel floating-point layout 100 in a screen space 402 having 25 physical pixels. The screen space 402 is represented by pixel reference numbers 1 to 25. In this example, the center of the floating-point layout 100 falls at pixel 12.5 in the 25 pixels of the screen space 402. As such, the first pixel—drawing-element of the 20-pixel layout falls at pixel 2.5, shown at 402a in the screen space 402. The last pixel of the 20-pixel layout falls at pixel 22.5, shown at 402d in the screen space. Similarly, adjacent edges of the first child 102 and second child 104 fall at pixel 9.16667, shown at 402b, calculated as follows: 25−20=5; 5±2=2.5; 2.5+6.6667=9.16667. Adjacent edges of the second child 104 and third child 106 fall at pixel 15.8333, shown at 402c, calculated as 9.16667+6.6667=15.8333. Accordingly, the drawing of the elements in the screen space 402 results in a first color (e.g., blue) from pixels 2.5 to 9.16667, a second color (e.g., white) from 9.16667 to 15.8333, and a third color (e.g., green) from 15.8333 to 22.5.

Undesirably, in this floating-point layout and floating-point drawing context, pixels 3 and 10 are antialiased, by some current techniques, with a lighter blue, as indicated by the upward-directed, wider-spaced pattern. Similarly, pixels 16 and 23 are antialiased a lighter green, as indicated by the downward-directed, wider-spaced pattern. Pixels 1, 2, 24, and 25 represent border pixels of the screen space 402 and are represented by a fourth color (e.g., gray) as indicated by the diamond outline pattern. Note that diagram 400 is another example that does not implement aspects according to principles of this disclosure, because pixels 3, 10, 16, and 23 are antialiased. Rather, diagram 400 is shown as a comparative reference point for FIG. 5 where aspects of an example layout-and-drawing manager according to principles of this disclosure are further detailed.

Pixel Offsets

Figure 5:
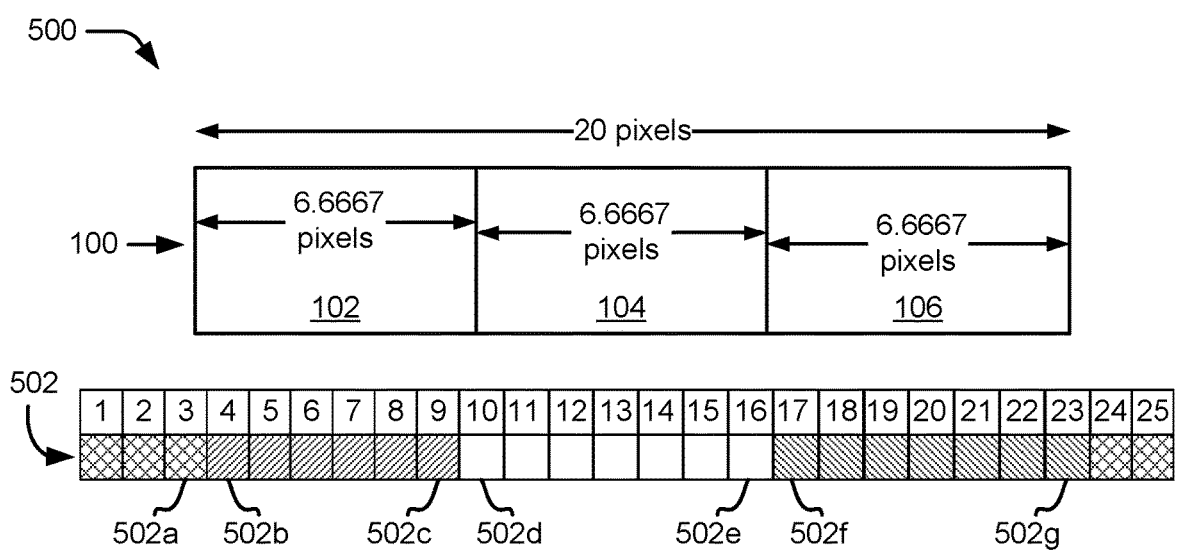
FIG. 5 illustrates a fifth example layout defined in floating point and having three children, illustrating the layout centered in a larger screen space of pixels, and including an element drawn relative to each child being pixel-aligned relative to pixel offsets.

FIG. 5 illustrates a diagram 500 depicting an example implementation of pixel offsets for drawing elements pixel-aligned in a 20-pixel floating-point layout (e.g., the floating-point layout 100) relative to a screen space 502 having 25 physical pixels. The screen space 502 is represented by pixel reference numbers 1 to 25. Diagram 500 illustrates a functionality of a layout-and-drawing manager that includes aspects of improving visual results by avoiding antialiasing and accumulated errors according to this disclosure. This is accomplished by referencing pixel offsets relative to the defined screen space 502 to draw elements pixel-aligned relative to the floating-point layout 100. In this example, the center of the 20-pixel, floating-point layout 100 falls at pixel 12.5 in the screen space 502. Additionally, the first pixel—drawing-element of the layout falls at pixel 2.5 in the screen space 502. The last pixel-drawing-element falls at pixel 22.5 in the screen space 502. However, in this example, pixel offsets relative to the screen space 502 are referenced for drawing the elements pixel-aligned, shown at 502b to 502g, relative to the screen space 502 and the floating-point layout 100.

To calculate offsets and draw pixel-aligned, the first border pixel values, representing the initial outer bounding of the layout in the screen space, are rounded to the nearest whole integer pixel value. These first-border pixel values are indicated by the diamond outline pattern representing an example gray color. This means the first border pixels 1 to 2.5 are rounded to whole integer pixels 1 to 3 (pixel 3 shown at 502a). The first-element pixel values, with respect to the first child 102, are then calculated relative to the screen space border pixels by rounding from the floating-point values to whole integer pixels 4 and 9, shown at 502b and 502c, respectively, as indicated by the upward-directed, narrow-spaced pattern, representing the blue element. The second-element pixel values, with respect to the second child 104, are rounded from 10 to 16, shown bounded by 502d to 502e, as indicated by the white-colored pixels. The third-element pixel values, with respect to the third child 106, are rounded from 17 to 23, shown bounded by 502f and 502g, as indicated by the downward-directed, narrow-spaced pattern. Finally, the second-border pixels 24 and 25 represent the opposite outer bounds of the layout in the 25-pixel space, as indicated by the diamond outline pattern representing the example gray color. Using these pixel offsets for generating a pixel-aligned drawing relative to a floating-point layout reduces antialiasing, improves element centering for nested layouts, and maintains clear, sharp element edges.

Table 1 (below) describes how pixel offsets may be calculated for drawing elements pixel-aligned in the floating-point layout 100 relative to the screen space 502 (20-pixel layout to a 25-pixel screen space) as described with respect to the diagram 500 of FIG. 5. However, this discussion and its corresponding calculations are merely an example, as principles of this disclosure are similarly applicable to drawing pixel-aligned in other floating-point-layout and screen-space configurations. These calculations also use zero-based pixel references and exclusive upper bounds.

For border pixels 0 to 2.5, the pixel offset integer-aligned, zero-based, pixel calculations are as follows: 0 rounds to 0, then +1 for the zero-based offset=1 (the integer-aligned pixel value). Then round 2.5 up to 3=3 (shown at 502a). Consequently, the border with no drawing fills pixels 1 to 3, as indicated by the diamond outline pattern.

For the first element 1, blue pixels 2.5 to 9.1, the pixel offset integer-aligned pixel calculations are as follows: 2.5 rounds to 3, then +1 for the zero-based offset=4 (shown at 502b). Then round 9.1 down to 9=9 (shown at 502c). Consequently, the first element draws in pixels 4 to 9, as indicated by the upward-directed, narrow-spaced pattern.

For the second element 2, white pixels 9.1 to 15.8, the pixel offset integer-aligned pixel calculations are as follows: 9.1 rounds to 9, then +1 for the zero-based offset=10 (shown at 502d). Then round 15.8 to 16=16 (shown at 502e). Consequently, the second element draws in pixels 10 to 16, as indicated by the white-space pixels.

For the third element 3, green pixels 15.8 to 22.5, the pixel offset integer-aligned pixel calculations are as follows: 15.8 rounds to 16, then +1 for the zero-based offset=17 (shown at 502f). Then round 22.5 to 23=23 (shown at 502g). Consequently, the third element draws in pixels 17 to 23, as indicated by the downward-directed, narrow-spaced pattern.

For the final border pixels 22.5 to 25, the pixel offset integer-aligned pixel calculations are as follows: 22.5 rounds to 23, then +1 for the zero-based offset=24 (the integer-aligned pixel value). Then round 25 to 25=25 (integer-aligned pixel value). Consequently, the final border with no drawing fills pixels 24 and 25.

TABLE 1

PIXEL OFFSET EXAMPLE CALCULATIONS FOR DRAWING IN A 20-PIXEL
FLOATING-POINT LAYOUT RELATIVE TO A 25-PIXEL SCREEN SPACE

| PIXEL LAYOUT (FLOATING POINT) | PIXEL OFFSET (INTEGER-ALIGNED PIXEL CALCULATION) (See also FIG. 5) |
|---|---|
| = Border (zero-based) = pixels 0 to 2.5 | Round 0 to 0, +1 zero-based offset = 1 (pixel value) Round 2.5 up to 3 = 3 (pixel value) = fills pixels 1 to 3 |
| = Element 1 (blue) = pixels 2.5 to 9.1 | Round up 2.5 to 3, +1 offset = 4 (pixel value) Round down 9.1 to 9 = 9 (pixel value) = fills pixels 4 to 9 |
| = Element 2 (white) = pixels 9.1 to 15.8 | Round down 9.1 to 9, +1 offset = 10 (pixel value) Round up 15.8 to 16 = 16 (pixel value) = fills pixels 10 to 16 |
| = Element 3 (green) = pixels 15.8 to 22.5 | Round up 15.8 to 16, +1 offset = 17 (pixel value) Round up 22.5 to 23 = 23 (pixel value) = fills pixels 17 to 23 |
| = Border (exclusive upper bound) = pixels 22.5 to 25 | Round up 22.5 to 23, +1 offset = 24 (pixel value) Round 25 to 25 = 25 (pixel value) = fills pixels 24 to 25 |

Accordingly, pixel offsets generate a pixel-aligned drawing relative to a floating-point layout. Although these examples describe a simple one-dimensional horizontal layout for ease of discussion, the same principles apply to other layouts for drawing elements. In a rectangular space, for example, the calculations and pixel offsets for drawing pixel-aligned relative to a floating-point layout are performed once to align drawing elements in the horizontal layout to integer-aligned pixel values, and once to align drawing elements in the vertical layout to integer-aligned pixel values. For example, if a layout is 7 pixels wide (e.g., horizontal) by 12 pixels tall (e.g., vertical), the calculations are performed to align and pixel offset a drawing element in the 7-pixels-wide screen-space context, and the calculations are similarly performed to align and pixel offset a drawing element in the 12-pixels-tall screen space context.

Example Methods

Figure 6:
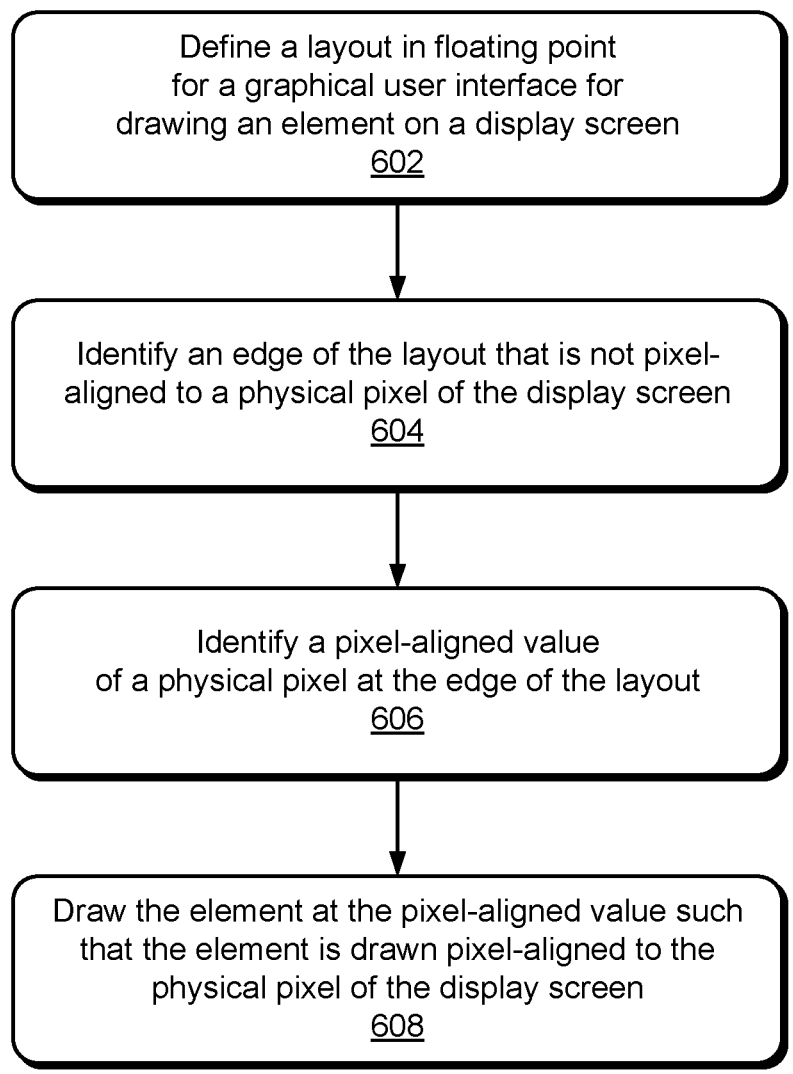
FIG. 6 illustrates an example method for defining a layout in floating point and drawing an element that is pixel-aligned.

Referring now to FIG. 6, a flow diagram illustrates an example method 600 for drawing pixel-aligned using a floating-point layout. At 602, a layout is defined in floating point for a graphical user interface using a layout-and-drawing manager according to principles of this disclosure, for drawing an element on a display screen of a computing device. Because the layout is defined in floating point, an edge of the layout may divide a whole pixel value relative to the physical pixels defined by the display screen. As such, at 604, an edge of the layout is identified that is not pixel-aligned to a physical pixel of the display screen. At 606, a pixel-aligned value is identified at the edge of the layout. The pixel-aligned value identifies a physical pixel of the display screen at the edge of the layout. This pixel-aligned value is identified by rounding up or rounding down the pixel value identified at the edge of the layout that is not pixel-aligned. For example, if an edge of the layout divides a pixel, say at a pixel value of 2.6, then the value of 2.6 is rounded up to the integer value of 3. This integer value will be used for drawing an element pixel-aligned on the display screen at pixel value 3. In one aspect, this process of identifying an edge of the layout, and identifying a pixel-aligned value at the edge of the layout, may be repeated for each edge of the layout and each edge of any child of the layout. At 608, the element is drawn at the pixel-aligned value. This ensures that the element is drawn pixel-aligned to the physical pixel of the display screen. Accordingly, this method defines a floating-point layout to maintain precision for laying out a drawing area on a display screen, yet drawing occurs pixel-aligned to physical pixels of the display screen for maintaining sharp element edges.

Figure 7:
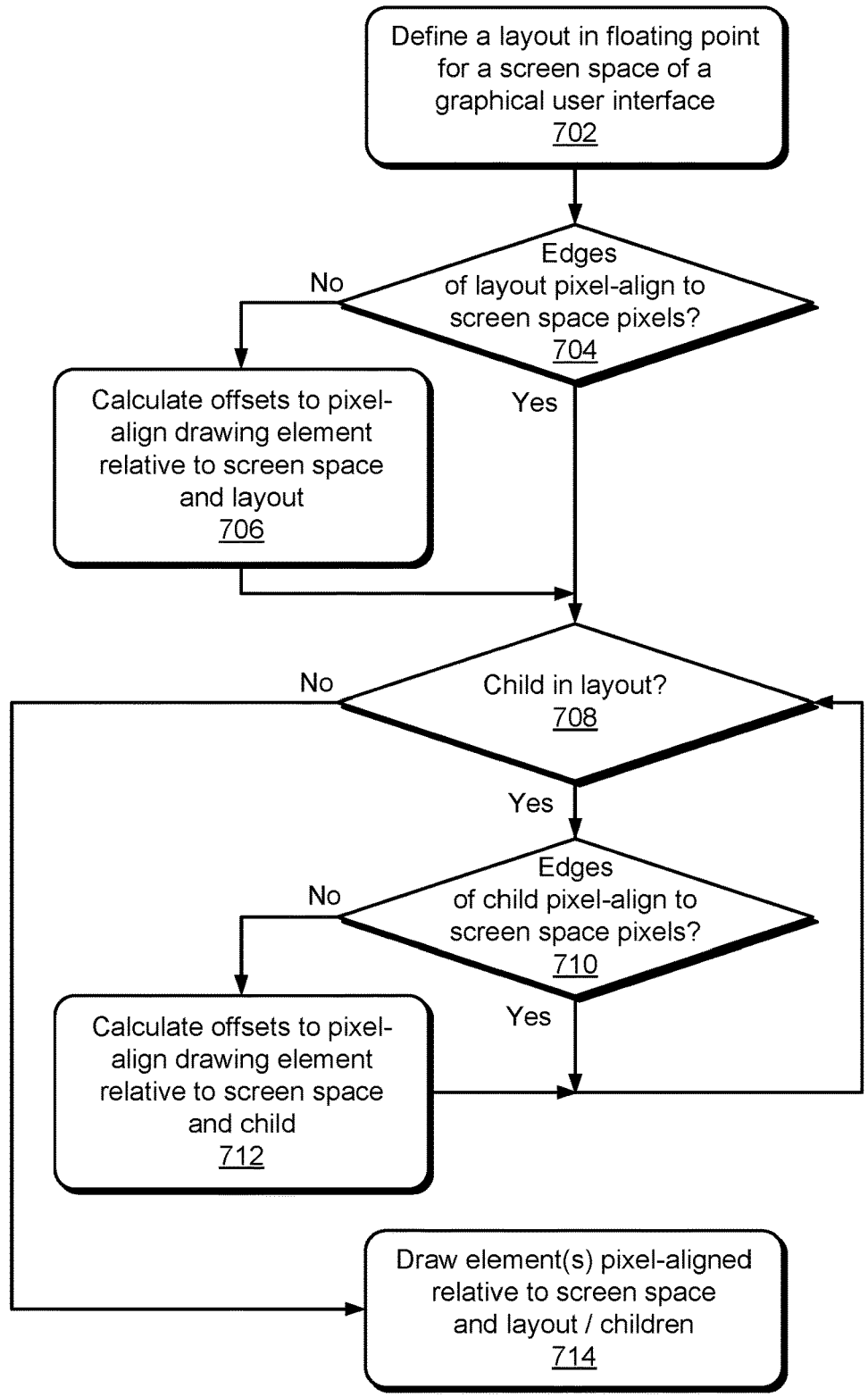
FIG. 7 illustrates an example method for defining a layout in floating point and drawing an element that is pixel-aligned using pixel offsets.

FIG. 7 is a flow diagram illustrating an example method 700 for drawing pixel-aligned using a floating-point layout and pixel offsets. At 702, a layout is defined in floating point relative to a screen space of a graphical user interface of a computing device for drawing an element. At 704, if the edges of the layout are not pixel-aligned to the screen space pixels, then at 706 pixel offsets are calculated to pixel-align a drawing element relative to the screen space and the layout. An example of determining these pixel offset calculations is described previously in reference to FIG. 5 and Table 1.

At 708, if there is no child defined in the layout, then at 714 the element is drawn pixel-aligned, based on the pixel offset calculations identified, relative to the layout defined. On the other hand, at 708, if a child is defined in the layout, then at 710 it is identified if edges of the child pixel-align to the screen space pixels. If the child edges pixel-align, then return and at 708 identify again whether another child is defined in the layout. If another child is defined in the layout, then at 710 again identify if the edges of the child pixel-align to the screen space pixels. If the edges do not pixel-align, then at 712 pixel offsets are calculated to pixel-align a drawing element relative to the screen space and child layout. An example of determining these pixel offset calculations is described previously in reference to FIG. 5 and Table 1.

Once the offset calculations are completed, and there are no more children in the layout at 708, then at 714 the element(s) in the layout and children layouts are drawn pixel-aligned, based on the pixel offset calculations identified, relative to the screen space, layout, and any children layouts defined. Stated another way, this example method of drawing elements pixel-aligned to the GUI screen-space pixels includes calculating pixel offsets by rounding, to a nearest integer value, a first pixel value associated with a first edge of the layout and relative to the screen space to identify a first pixel-aligned drawing pixel. Then rounding, to a nearest integer value, a second pixel value associated with a second edge of the layout and relative to the screen space to identify a second pixel-aligned drawing pixel. This process is repeated for each child in the layout. Then the element or elements are drawn pixel-aligned to the first drawing pixel with respect to the first edge of the layout, and pixel-aligned to the second drawing pixel with respect to the second edge of the layout for each child.

The operations and methods described herein, for example methods 600 and 700, may be embodied in programming instructions executable by a processor or processors in a computing device or system, either alone or in combination with hardware blocks in a computing device or system. Such programming instructions may be stored on a non-transitory, machine-readable medium (e.g., computer/processor-readable medium), for example a random access memory (RAM), read-only memory (ROM), flash memory, cache memory, solid-state drive (SSD), hard disk drive (HDD), or combinations thereof, for execution on a processor or processors of a computing device or devices.

The example methods described in this disclosure may include more than one implementation, and different implementations of the methods may not employ every operation presented in the respective flow diagrams or may employ additional operations not shown. Additionally, while the operations of the methods are presented in a particular order within the flow diagram(s), the order of their presentations is not intended to be a limitation as to the order in which the operations may actually be implemented, or as to whether any, some, or all of the operations may be implemented. For example, one implementation of the method might be achieved through the performance of a number of initial operations without performing subsequent operations, while another implementation of the method might be achieved through the performance of more or all of the operations.

User Equipment

Figure 8:
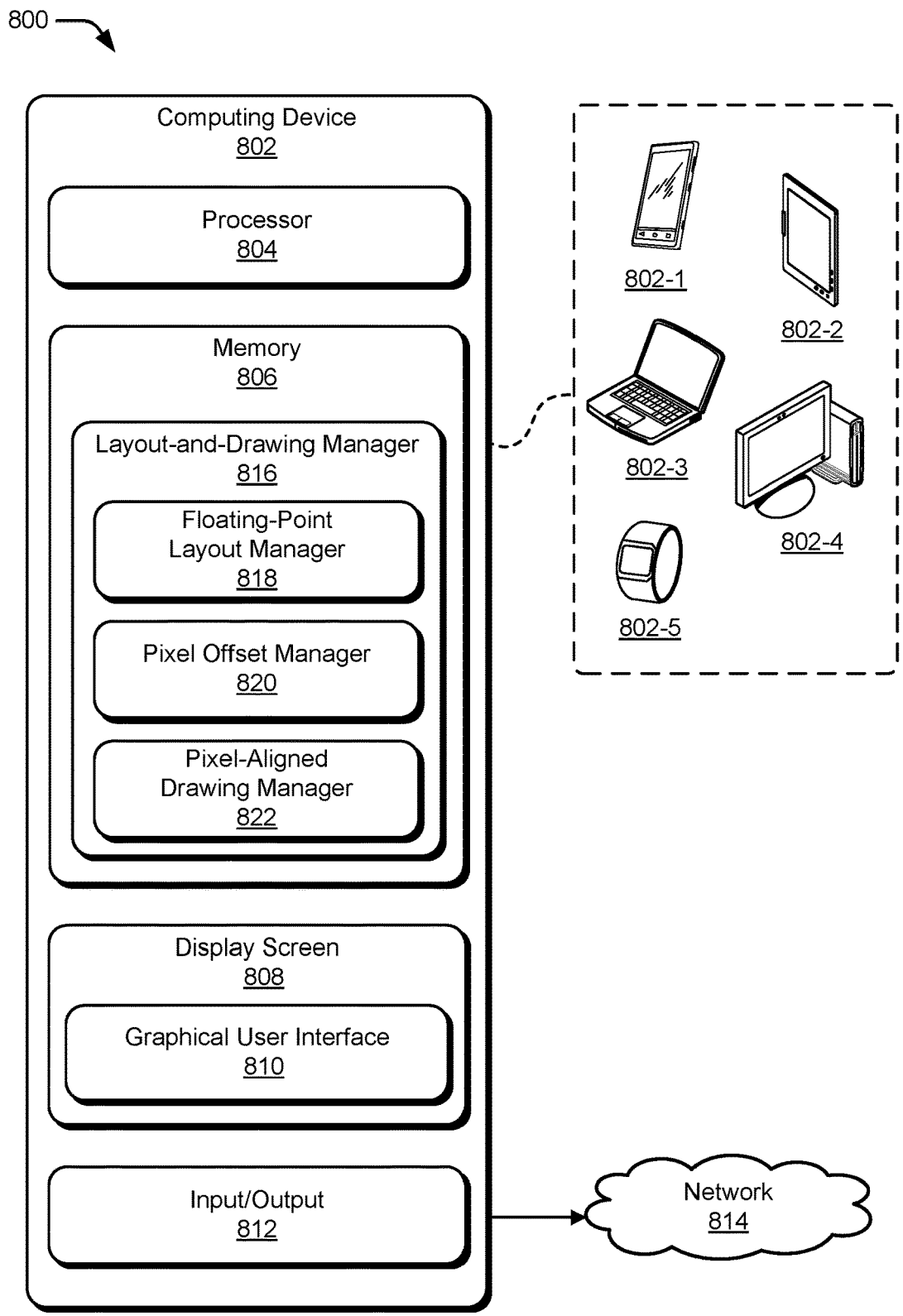
FIG. 8 illustrates an example block diagram for a user equipment that can implement various aspects of defining a layout in floating point and drawing an element that is pixel-aligned.

FIG. 8 is a block diagram illustrating an example computing system 800 that includes a computing device 802. The computing device 802 may be configured with components and functionality for drawing a pixel-aligned element using a floating-point layout for display on a graphical user interface display screen of the computing device. As some non-limiting examples, the computing device 802 may be a mobile computing device, a mobile phone 802-1, a tablet device 802-2, a laptop computer 802-3, a desktop computer, a server computer, or a television/display 802-4, or other user device for example a computerized digital watch 802-5.

The computing device 802 may include a processor 804, a memory 806, a display screen 808 displaying a graphical user interface 810, and an input/output module 812. The processor 804 may be any central processing unit (CPU), with one or more cores, configured to execute instructions stored in the memory 806. The memory 806 may be any non-transitory, machine-readable medium (e.g., computer/processor-readable medium), for example RAM, ROM, flash memory, cache memory, SSD, HDD, or a combination thereof, for storing program files, data, an operating system, and other executable instructions. The graphical user interface 810 may be displayed on any pixel-based display screen 808, monitor, touch screen, or similar output device associated with or connected to the computing device 802. The input/output module 812 comprises functionality to enable input and output communications with the computing device 802 by a user by way of, or in coordination with, for example, a keyboard, mouse, touch screen, or other input or output device. The network 814 may be any local area network (LAN), wide area network (WAN), cloud, multi-cloud, hybrid cloud, or private on-premise cloud computing environment, with which the computing device 802 may communicate to send and/or receive data, either wirelessly or via hard-wired connection, through input/output module 812.

The memory 806 includes a layout-and-drawing manager 816 that performs functionality according to principles of this disclosure. In FIG. 8, the layout-and-drawing manager 816 is depicted simply as an application defined by executable instructions, for example firmware or software, in the memory 806 for execution on the processor 804. However, the operations of the layout-and-drawing manager 816 may be implemented in whole or in part using an application-specific integrated circuit (ASIC), for example a system-on-a-chip (SoC), and/or other hardware components either alone or in combination with programming instructions executable by the processor 804. In any case, the layout-and-drawing manager 816 provides functionality to define a floating-point layout and draw a pixel-aligned element including, optionally, relative to pixel offsets, for display on the graphical user interface 810 of a display screen 808 according to principles of this disclosure.

The layout-and-drawing manager 816 may include a floating-point layout manager 818, a pixel offset manager 820, and a pixel-aligned drawing manager 822. These manager-modules are shown separately in the illustration for discussion purposes, but they may be combined or further separated into additional modules, according to design and functional preference. The floating-point layout manager 818 functions to enable a user to define a layout in floating point for display using a graphical user interface 810 on a screen space of the display screen 808. The pixel offset manager 820 functions to identify whether the edges of the layout are pixel-aligned to the screen space physical pixels and, if they are not pixel-aligned, calculate offsets to pixel-align a drawing element relative to the screen space and the layout. An example of determining these offset calculations is described previously in reference to FIG. 5 and Table 1.

The pixel offset manager 820 also identifies if there are children defined in the layout that have edges that are not pixel-aligned to the screen space. If there are children that are not pixel-aligned, then the pixel offset manager calculates pixel offsets to pixel-align a drawing element relative to the screen space, the layout, and the children. An example of determining these pixel offset calculations is described previously in reference to FIG. 5 and Table 1. Once the pixel offset calculations are calculated for the layout and any child layouts, then the pixel-aligned drawing manager 822 draws the elements pixel-aligned, based on the pixel offset calculations identified, relative to the screen space, layout, and the child layouts.

Accordingly, the layout-and-drawing manager 816 defines a floating-point layout and may identify pixel offsets relative to a defined screen space of the display screen 808 and graphical user interface 810 for elements to be drawn. It then generates a pixel-aligned drawing of the elements relative to the floating-point layout. This pixel-aligned drawing improves visual results, including improving the centering of nested layouts and crisp element edges.

While this disclosure has been described with respect to example embodiments outlined above, it is evident that alternatives, modifications, and variations will be apparent to those skilled in the art. Accordingly, the described and depicted embodiments of the present disclosure are intended to be illustrative, not limiting, and the subject of the appended claims is not necessarily limited to the specific features or methods described in this disclosure.

EXAMPLES

In the following paragraphs, some examples are described.

Example 1: A method including defining, by a computing device, a layout in floating point for a graphical user interface, the layout defining an area for drawing an element on a display screen; identifying, by the computing device, an edge of the layout that is not pixel-aligned to a physical pixel of the display screen; identifying, by the computing device, a pixel-aligned value at the edge of the layout, the pixel-aligned value identifying a physical pixel of the display screen; and drawing, by the computing device, the element to be pixel-aligned by aligning the element to the physical pixel of the display screen, the drawing based on the pixel-aligned value.

Example 2: The method of example 1, wherein defining a layout in floating point for a graphical user interface further includes defining a child of the layout in floating point.

Example 3: The method of any preceding example wherein identifying the pixel-aligned value at the edge of the layout further includes calculating a value integer-aligned to the physical pixel of the display screen.

Example 4: The method of any preceding example wherein drawing the element to be pixel-aligned by aligning the element to the physical pixel of the display screen further includes drawing the element relative to pixel offsets of the display screen.

Example 5: The method of any of examples 1 to 3 wherein drawing the element to be pixel-aligned by aligning the element to the physical pixel of the display screen further includes drawing the element relative to pixel offsets identified by at least one of a whole pixel value or an integer pixel value.

Example 6: The method of any of examples 1 to 3 wherein drawing the element to be pixel-aligned by aligning the element to the physical pixel of the display screen further includes drawing the element relative to pixel offsets of a defined area of the display screen, the pixel offsets calculated by rounding, to a nearest whole value, a pixel value associated with at least one of the defined area of the display screen, the graphical user interface, the layout, or the element.

Example 7: The method of any of examples 1 to 3 wherein drawing the element to be pixel-aligned by aligning the element to the physical pixel of the display screen further includes rounding, to a nearest integer value, a first pixel value associated with a first edge of the layout, the rounding of the first pixel value identifying a first drawing pixel; rounding, to a nearest integer value, a second pixel value associated with a second edge of the layout, the rounding of the second pixel value identifying a second drawing pixel; and drawing the element pixel-aligned to the first drawing pixel with respect to the first edge of the layout, and pixel-aligned to the second drawing pixel with respect to the second edge of the layout.

Example 8: The method of any of examples 1, 3, 4, 5, or 6 wherein defining a layout in floating point for a graphical user interface further includes defining a child of the layout in floating point, and wherein drawing the element to be pixel-aligned by aligning the element to the physical pixel of the display screen further includes drawing the element pixel-aligned to the physical pixel of the display screen identified by the child, including: rounding, to a nearest integer value, a first pixel value associated with a first edge of the child, the rounding of the first pixel value identifying a first drawing pixel; rounding, to a nearest integer value, a second pixel value associated with a second edge of the child, the rounding of the second pixel value identifying a second drawing pixel; and drawing the element pixel-aligned to the first drawing pixel with respect to the first edge of the child, and pixel-aligned to the second drawing pixel with respect to the second edge of the child.

Example 9: The method of any preceding example wherein drawing the element to be pixel-aligned by aligning the element to the physical pixel of the display screen includes drawing the element relative to at least one of a horizontal direction relative to the display screen or a vertical direction relative to the display screen.

Example 10: The method of example 1 or example 2, wherein identifying a pixel-aligned value at the edge of the layout further includes calculating a pixel-aligned value relative to a pixel offset identified by whole pixel values with respect to a defined area of the display screen.

Example 11: The method of example 1 or example 2, wherein identifying a pixel-aligned value at the edge of the layout further includes calculating a pixel-aligned value relative to pixel offsets of a defined area of the display screen, the pixel offsets calculated by rounding, to a nearest whole value, a pixel value associated with at least one of the defined area of the display screen, the graphical user interface, the layout, or the element.

Example 12: A user device including a processor and a computer-readable storage medium having instructions stored thereon that, responsive to execution by the processor, cause the processor to execute the method of any of examples 1 to 11.

Example 13: A mobile computing device including a layout-and-drawing manager configured to perform the method of any of examples 1 to 11.

Example 14: A system implementing the method of any of examples 1 to 11.

Example 15: A computer-readable storage medium including instructions that, when executed by at least one processor, cause the at least one processor to perform the method of any of examples 1 to 11.

Example 16: A system including means to perform the method of any of examples 1 to 11.

What is claimed is:

1. A method comprising:
defining, by a computing device, a layout in floating point for a graphical user interface, the layout in floating point defining an area for drawing an element on a display screen, wherein the layout comprises one or more edges, wherein each edge of the layout has a corresponding floating point value;
identifying, by the computing device based on a physical pixel screen space, an edge of the layout in floating point that is not pixel-aligned to a physical pixel of the display screen, wherein the edge of the layout in floating point does not align with the physical pixel of the display screen based on the corresponding floating point value for the edge;
identifying, by the computing device, a pixel-aligned value for the edge of the layout, the pixel-aligned value identifying a physical pixel of the display screen; and
drawing, by the computing device, the element by aligning the element to the physical pixel of the display screen, the drawing based on the pixel-aligned value.

2. The method of claim 1, wherein defining a layout in floating point for a graphical user interface further comprises:

defining a child of the layout in floating point.

3. The method of claim 1, wherein identifying the pixel-aligned value at the edge of the layout further comprises:

calculating a value integer-aligned to the physical pixel of the display screen.

4. The method of claim 1, wherein drawing the element to be pixel-aligned by aligning the element to the physical pixel of the display screen further comprises:

drawing the element relative to pixel offsets of the display screen.

5. The method of claim 1, wherein drawing the element to be pixel-aligned by aligning the element to the physical pixel of the display screen further comprises:

drawing the element relative to pixel offsets identified by at least one of a whole pixel value or an integer pixel value.

6. The method of claim 1, wherein drawing the element to be pixel-aligned by aligning the element to the physical pixel of the display screen further comprises:

drawing the element relative to pixel offsets of a defined area of the display screen, the pixel offsets calculated by rounding, to a nearest whole value, a pixel value associated with at least one of the defined area of the display screen, the graphical user interface, the layout, or the element.

7. The method of any of claim 1, wherein drawing the element to be pixel-aligned by aligning the element to the physical pixel of the display screen further comprises:

rounding, to a nearest integer value, a first pixel value associated with a first edge of the layout, the rounding of the first pixel value identifying a first drawing pixel;

rounding, to a nearest integer value, a second pixel value associated with a second edge of the layout, the rounding of the second pixel value identifying a second drawing pixel; and drawing the element pixel-aligned to the first drawing pixel with respect to the first edge of the layout and pixel-aligned to the second drawing pixel with respect to the second edge of the layout.

8. The method of claim 1, wherein defining a layout in floating point for a graphical user interface further comprises:

defining a child of the layout in floating point, and wherein drawing the element to be pixel-aligned by aligning the element to the physical pixel of the display screen further comprises:

drawing the element pixel-aligned to the physical pixel of the display screen identified by the child, comprising:

rounding, to a nearest integer value, a first pixel value associated with a first edge of the child, the rounding of the first pixel value identifying a first drawing pixel;

rounding, to a nearest integer value, a second pixel value associated with a second edge of the child, the rounding of the second pixel value identifying a second drawing pixel; and drawing the element pixel-aligned to the first drawing pixel with respect to the first edge of the child, and pixel-aligned to the second drawing pixel with respect to the second edge of the child.

9. The method of claim 1, wherein drawing the element to be pixel-aligned by aligning the element to the physical pixel of the display screen comprises:

drawing the element relative to at least one of:
a horizontal direction relative to the display screen, or
a vertical direction relative to the display screen.

10. The method of claim 1, wherein identifying a pixel-aligned value at the edge of the layout further comprises:

calculating a pixel-aligned value relative to a pixel offset identified by whole pixel values with respect to a defined area of the display screen.

11. The method of claim 1, wherein identifying a pixel-aligned value at the edge of the layout further comprises:

calculating a pixel-aligned value relative to pixel offsets of a defined area of the display screen, the pixel offsets calculated by rounding, to a nearest whole value, a pixel value associated with at least one of the defined area of the display screen, the graphical user interface, the layout, or the element.

12. A user device comprising:
a processor; and
a computer-readable storage medium having instructions stored thereon that, responsive to execution by the processor, cause the processor to perform operations comprising:

defining a layout in floating point for a graphical user interface, the layout in floating point defining an area for drawing an element on a display screen, wherein the layout comprises one or more edges, wherein each edge of the layout has a corresponding floating point value;

identifying, based on a physical pixel screen space, an edge of the layout in floating point that is not pixel-aligned to a physical pixel of the display screen, wherein the edge of the layout in floating point does not align with the physical pixel of the display screen based on the corresponding floating point value for the edge;

identifying a pixel-aligned value for the edge of the layout, the pixel-aligned value identifying a physical pixel of the display screen; and drawing the element by aligning the element to the physical pixel of the display screen, the drawing based on the pixel-aligned value.

13. The user device of claim 12, wherein defining a layout in floating point for a graphical user interface further comprises:

defining a child of the layout in floating point.

14. The user device of claim 12, wherein identifying the pixel-aligned value at the edge of the layout further comprises:

calculating a value integer-aligned to the physical pixel of the display screen.

15. The user device of claim 12, wherein drawing the element to be pixel-aligned by aligning the element to the physical pixel of the display screen further comprises:

drawing the element relative to pixel offsets of the display screen.

16. The user device of claim 12, wherein drawing the element to be pixel-aligned by aligning the element to the physical pixel of the display screen further comprises:

drawing the element relative to pixel offsets identified by at least one of a whole pixel value or an integer pixel value.

17. The user device of claim 12, wherein drawing the element to be pixel-aligned by aligning the element to the physical pixel of the display screen further comprises:

drawing the element relative to pixel offsets of a defined area of the display screen, the pixel offsets calculated by rounding, to a nearest whole value, a pixel value associated with at least one of the defined area of the display screen, the graphical user interface, the layout, or the element.

18. The user device of claim 12, wherein drawing the element to be pixel-aligned by aligning the element to the physical pixel of the display screen further comprises:
rounding, to a nearest integer value, a first pixel value associated with a first edge of the layout, the rounding of the first pixel value identifying a first drawing pixel;
rounding, to a nearest integer value, a second pixel value associated with a second edge of the layout, the rounding of the second pixel value identifying a second drawing pixel; and
drawing the element pixel-aligned to the first drawing pixel with respect to the first edge of the layout and pixel-aligned to the second drawing pixel with respect to the second edge of the layout.

19. The user device of claim 12, wherein defining a layout in floating point for a graphical user interface further comprises:
defining a child of the layout in floating point, and wherein drawing the element to be pixel-aligned by aligning the element to the physical pixel of the display screen further comprises:
drawing the element pixel-aligned to the physical pixel of the display screen identified by the child, comprising:
rounding, to a nearest integer value, a first pixel value associated with a first edge of the child, the rounding of the first pixel value identifying a first drawing pixel;
rounding, to a nearest integer value, a second pixel value associated with a second edge of the child, the rounding of the second pixel value identifying a second drawing pixel; and
drawing the element pixel-aligned to the first drawing pixel with respect to the first edge of the child, and pixel-aligned to the second drawing pixel with respect to the second edge of the child.

20. A non-transitory computer-readable storage medium comprising instructions that, when executed by at least one processor, cause the at least one processor to perform operations comprising:
defining a layout in floating point for a graphical user interface, the layout in floating point defining an area for drawing an element on a display screen, wherein the layout comprises one or more edges, wherein each edge of the layout has a corresponding floating point value;
identifying, based on a physical pixel screen space, an edge of the layout in floating point that is not pixel-aligned to a physical pixel of the display screen, wherein the edge of the layout in floating point does not align with the physical pixel of the display screen based on the corresponding floating point value for the edge;
identifying a pixel-aligned value for the edge of the layout, the pixel-aligned value identifying a physical pixel of the display screen; and
drawing the element by aligning the element to the physical pixel of the display screen, the drawing based on the pixel-aligned value.

* * * * *